United States Patent [19]

Yamashita et al.

[11] Patent Number: 5,078,115
[45] Date of Patent: Jan. 7, 1992

[54] HEATING DEVICE

[75] Inventors: Takahisa Yamashita, Suntoh; Kazuo Kayanuma, Totenba; Yasushi Hibino, Suntoh, all of Japan

[73] Assignee: Texas Instruments Incorporated, Dallas, Tex.

[21] Appl. No.: 612,055

[22] Filed: Nov. 9, 1990

[30] Foreign Application Priority Data

Dec. 28, 1989 [JP] Japan ................................ 1-339763

[51] Int. Cl.⁵ .............................................. F02M 31/00
[52] U.S. Cl. .................................... 123/549; 123/552; 337/3; 337/107
[58] Field of Search ........................ 123/549, 552, 557; 219/202, 205, 206, 207, 208, 504, 505, 552, 553; 337/3, 102, 103, 104, 105, 106, 107

[56] References Cited

U.S. PATENT DOCUMENTS

| | | | |
|---|---|---|---|
| 2,057,808 | 10/1936 | Widegren | 123/549 |
| 2,145,029 | 1/1939 | Moseley | 123/549 |
| 2,901,574 | 8/1959 | Raab | 337/3 |
| 4,141,327 | 2/1979 | Marcoux et al. | 123/549 |
| 4,295,114 | 10/1981 | Pohl | 337/3 |
| 4,450,823 | 5/1984 | Abe et al. | 123/549 |
| 4,887,062 | 12/1989 | Bletz | 337/107 |

Primary Examiner—Andrew M. Dolinar
Assistant Examiner—M. Macy
Attorney, Agent, or Firm—John A. Haug; James P. McAndrews; Melvin Sharp

[57] ABSTRACT

A thermally and electrically conductive housing having a solid tip portion is shown mounting a heating element thermally and electrically coupled to the tip portion which in turn is electrically coupled to a switch mechanism mounted within the housing. The switch mechanism includes a thermostatic snap acting disc adapted to bias a movable electrical contact away from a stationary electrical contact at preselected temperatures. The housing is shown mounted in a carburetor of an automobile to contact energization of a honeycomb heater disposed in the carburetor, however; the device can be used in other locations where it is desired to maintain a body within a selected temperature range.

15 Claims, 6 Drawing Sheets

HEATING DEVICE

BACKGROUND OF THE INVENTION

This invention relates generally to an electric heating device and more particularly to such a device having improved control of energization.

In an automobile, gasoline is atomized and, if necessary, a suitable amount of air is automatically supplied, thereby obtaining a combustible gas (mixed gas), which is then supplied to the combustion chamber of the engine. A carburetor is employed for obtaining a mixed gas of air and gasoline.

Figure 6:
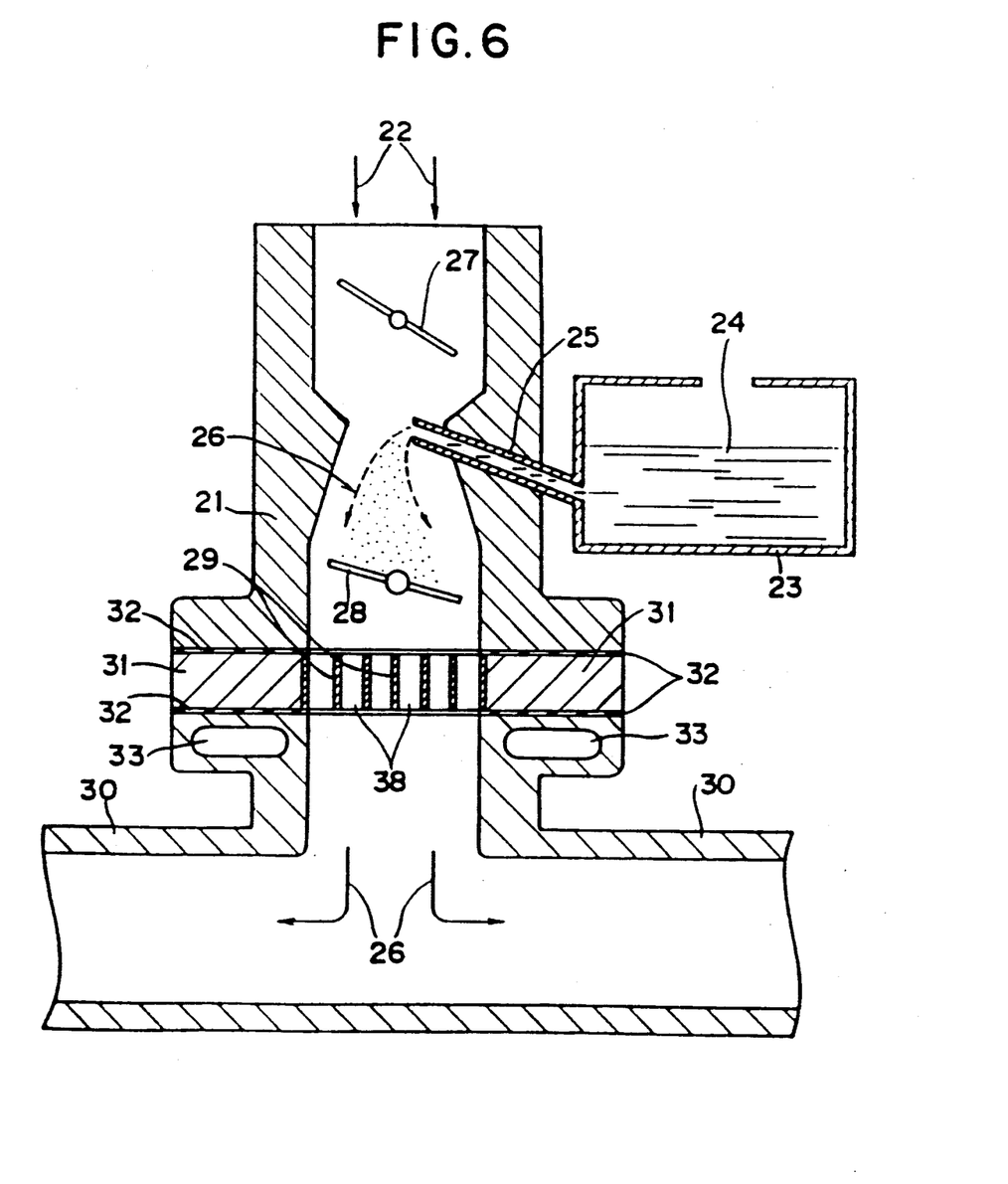
FIG. 6 is a cross section of a prior art carburetor.

This may be explained with reference to FIG. 6. A throttle body 21 is formed as a venturi tube whose intermediate range diameter is reduced. Due to air 22 that has been supplied through a butterfly valve 27 from this air supply opening, the gasoline 24 inside the float chamber 23 is atomized at the tip of a nozzle 25. A mixed gas 26 of this atomized gasoline and air is preliminarily heated by a honeycomb heater 29 through a butterfly valve 28 and is led to the combustion chamber of the engine (the combustion chamber is not shown in the drawings) through a branching pipe of an intake manifold 30.

It is mentioned in this connection that the throttle body 21 and the intake manifold are, in effect, integral with each other having an air tight connection therebetween, with a gasket 32 serving as an insulator that surrounds the honeycomb heater 29. A large number of gas passageways 38 are formed in a dense array on the honeycomb heater 29 and, as the heater itself is made electrically conductive, the mixed gas that passes therethrough is heated to a prescribed temperature, thereby effecting the prevention of knocking and the economy of the fuel that is consumed.

In the manifold 30, there is formed a warm water passageway 33 that directs water that has been warmed as it passes the cold water jacket around the cylinder liner that is not shown in the drawings. The honeycomb heater 29 is so constructed that electric power is de-energized when the temperature of the engine cooling water rises to a selected value (such as 70 degrees centigrade, to cite an example) for the purpose of saving electricity on the part of the battery 39.

Figure 7:
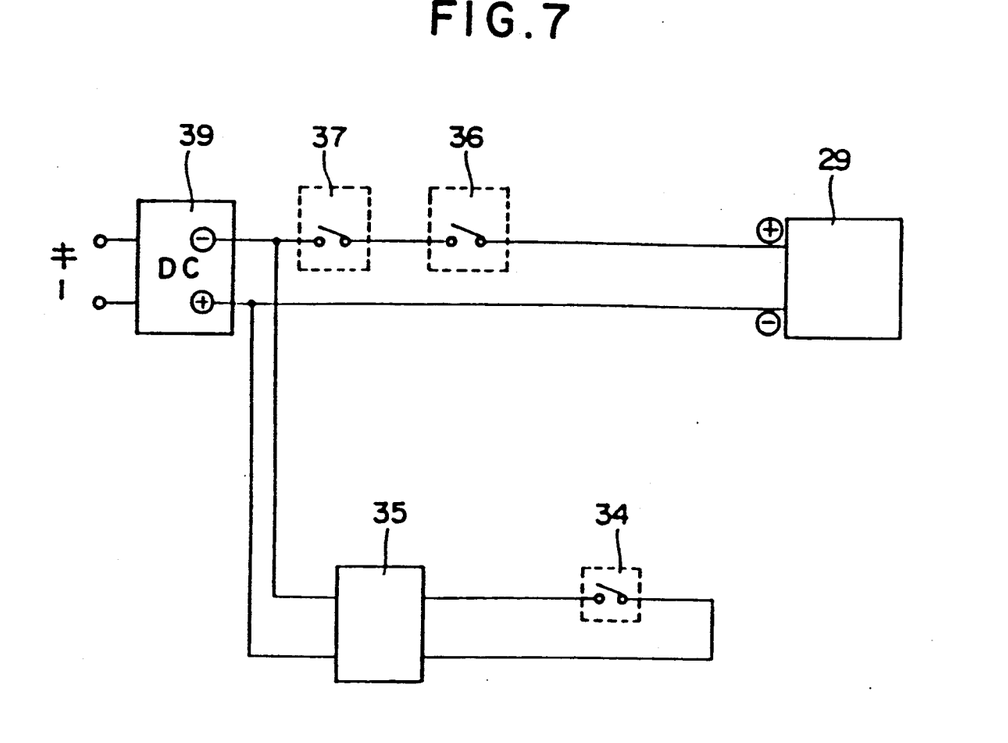
FIG. 7 is an electrical schematic of the electric circuit used with the FIG. 6 system.

FIG. 7 is a schematic diagram of an electric circuit designed for use with the honeycomb heater 29. A water temperature sensor 34 that detects the temperature of the engine cooling water is provided in the cooling water passageway and a signal that operationally controls a magnetic switch 36 is outputted from a control unit 35 on the basis of the water temperature detected.

Accordingly, in the case where the water temperature has exceeded a standard value, the switch 36 turns off, with a result that the electric current flow to the honeycomb heater 29 is terminated. Numeral 37 in the figure indicates an ignition switch.

According to the manifold heating method using warm water as described above, the warm water that has been employed as cooling water does not necessarily maintain a constant temperature at all times but changes in accordance with operation conditions of the engine or different loads. The use of warm water accompanying such temperature changes as a heat source results in frequent energization and de-energization of the honeycomb heater. This is undesirable since it results in excessive use of the electric circuit system shown in FIG. 7.

According to the method of heating the manifold by warm water, further, it is necessary to provide a complicated electric circuitry system for control such as water temperature sensor 34 and control unit 35 for effecting the aforementioned control of the honeycomb heater 29. This is generally disadvantageous in terms of mounting operations.

The aforementioned problem exists not only in an automobile engine but also in the heating parts of various machines and apparatus.

SUMMARY OF THE INVENTION

It is an object of the present invention to provide an improved, simplified control for energizing a fuel/air heater. It is another object to provide a control which is more stable and reliable than that of the prior art. Yet another object is the provision of a heating device which has an integral control to effect its state of energization and de-energization.

Briefly, in accordance with the invention a heating device is fixed at a prescribed location that is to be heated and to a heating device wherein a heating element and an accommodating part that accommodates this heating element are unitized and control means that controls the energization and de-energization of an electric heating element is mounted within the device.

According to a feature of the invention an open ended, cup shaped, thermally conductive base has a threaded tip or plug portion which is received in a throttle body which is to be heated. The base receives a heating element such as a PTC element which is electrically coupled between the base and the bottom surface of an electrically conductive plate mounted in the base. A spring contact extends from the top surface of the plate to a stationary contact mounted in an electrically insulative header closing the open end of the base. A thermostatic member is disposed between the spring contact and the stationary contact and is movable between first and second configurations dependent upon its temperature with the thermostatic member biasing the spring contact out of engagement with the stationary contact in one of its two configurations. The heating device is adapted to heat the throttle body and maintain it within a selected range above a preselected temperature to permit de-energization of the honeycomb heater as soon as the throttle body reaches that temperature and to maintain the honeycomb heater in the de-energized state as long as the motor is in operation. While the heating device is particularly well suited for use with automotive throttles it can be used in many other applications where it is desired to heat a body to a selected temperature and maintain it within a selected temperature range.

Since a heating element and an accommodating part that accommodates this heating element are unitized and the control means that effects the on-off control of the electric supply to the aforementioned heating element is accommodated therein according to this invention, it becomes possible to carry out stable heating at all times by using a unit that has been prepared to have the desired shape and size.

BRIEF DESCRIPTION OF THE DRAWINGS

FIGS. 1 through 5 show an example incorporating this invention in a throttle body in the carburetor.

Figure 1:
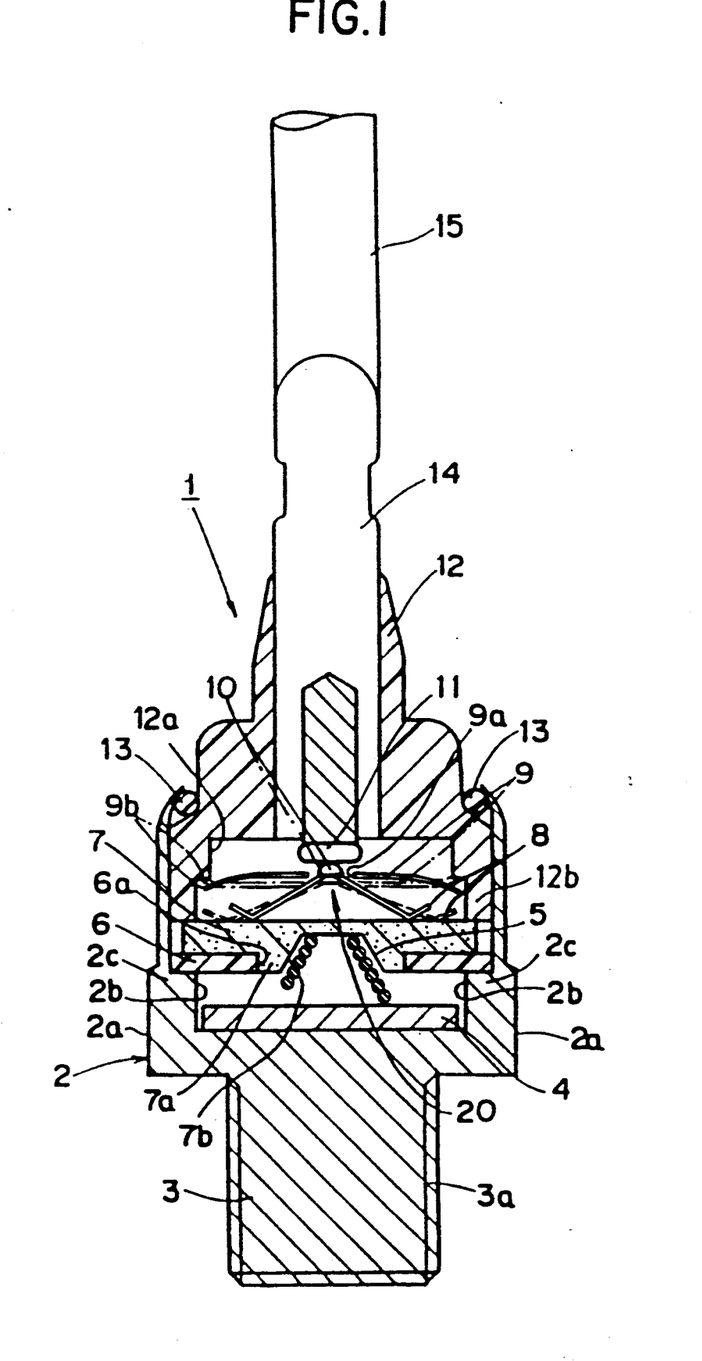
FIG. 1 is a cross sectional view of a heating device made in accordance with the invention taken through line 1—1 of FIG. 2.
Figure 2:
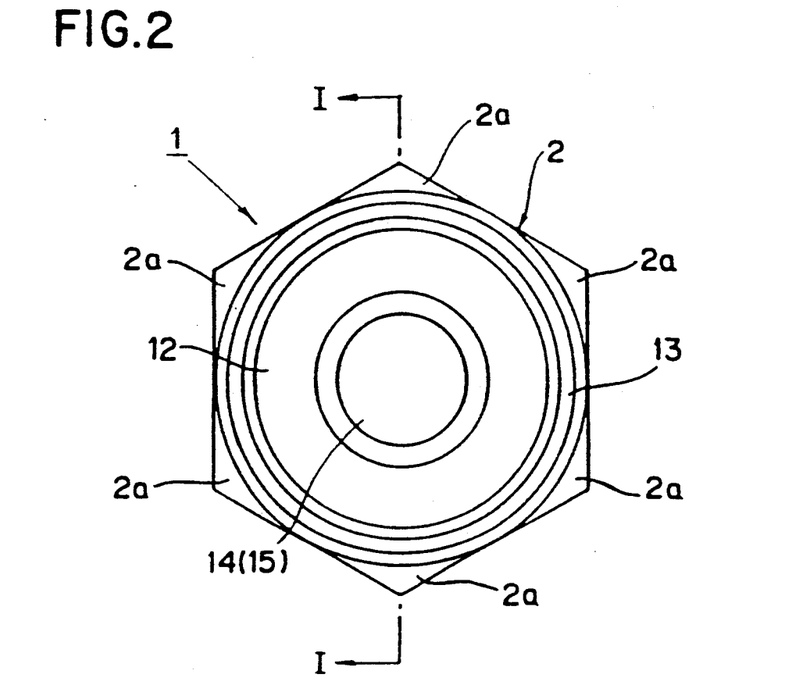
FIG. 2 is a top plan view of the FIG. 1 device.

As shown in FIG. 1, the base housing 2 consists of an aluminum alloy or a copper alloy (such as brass), with a male screw 3a being formed at the solid tip or plug end 3 thereof. As will be shown in FIG. 3 below, it can be mounted on an object to be heated such as the throttle body, etc. A polygonal brim 2a (a hexagon in this case) is provided in the neighborhood of the tip 3 of the side wall of the housing 2, thereby making it easier to effect the aforementioned mounting by means of a male screw 3a. A disc-shaped heating element (a PTC positive temperature coefficient element in this case) 4 is fixed in the cavity of housing 2 at a recessed portion 2b of the housing, and a generally conical configured coil spring 5 for electrical connection is provided on the top surface of this heating element 4.

On an annular-shaped electrically insulating plate member 6, moreover, an electrically conductive frame or plate 7, which is likewise disc-shaped, is placed with a boss portion 7a being inserted into opening 6a of annular member 6 and which is fixed on a ledge in the side wall 2c of the recessed portion 2b in the housing.

The smaller outside diameter end of electrically conductive spring 5 is inserted into a concave part 7b of electrically conductive frame 7 electrically conductive frame 7 with the larger outside diameter end in engagement with the top surface of heating element 4. Because of this, the position of the electrically conducting spring 5 is determined and it will not deviate from above the heating element 4. The electrically conducting spring 5 is held between the heating element 4 and the electrically conducting frame 7, thereby providing a selected contact pressure.

Figure 4:
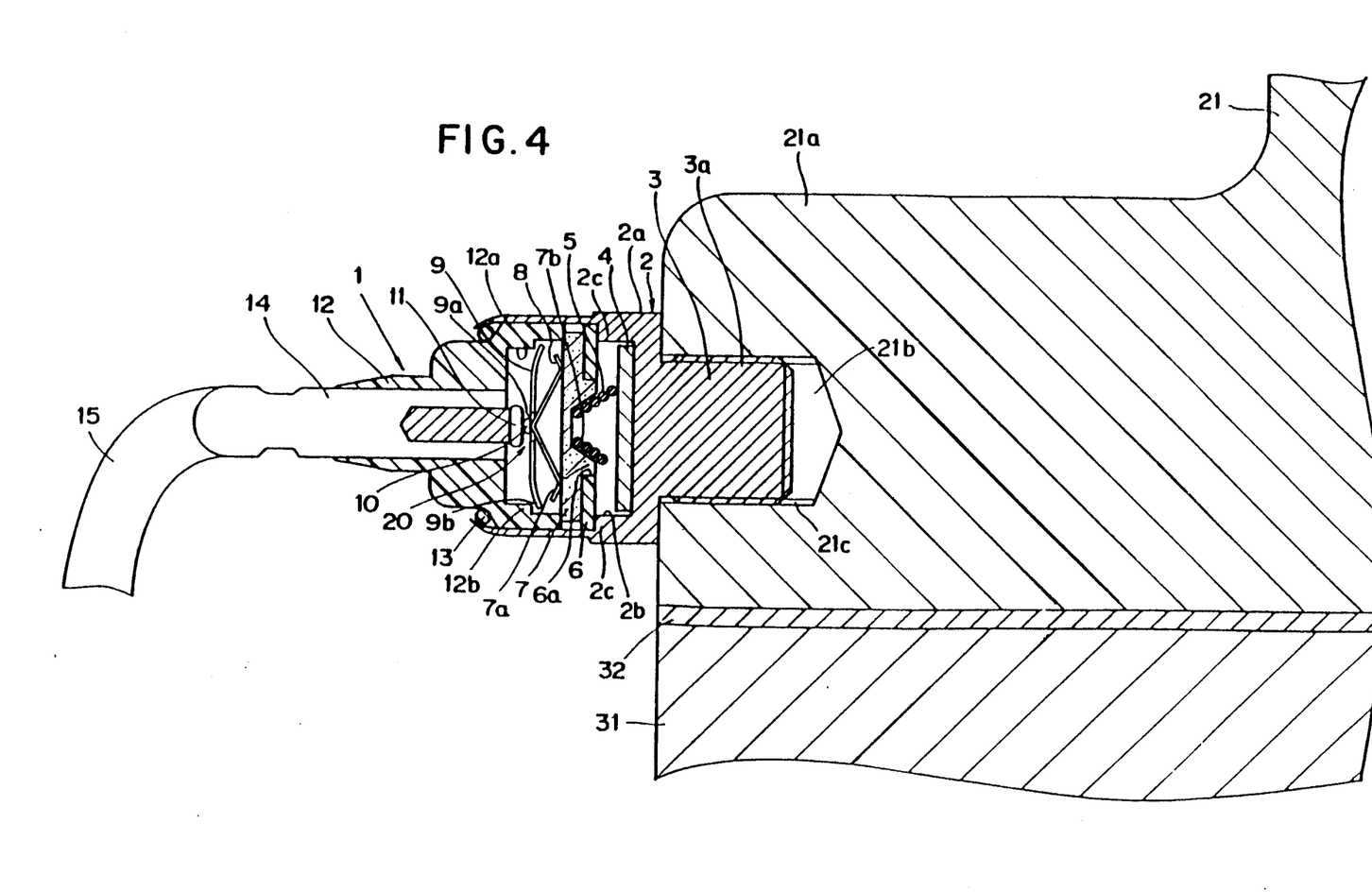
FIG. 4 is an expanded view of a portion of FIG. 3.
Figure 5:
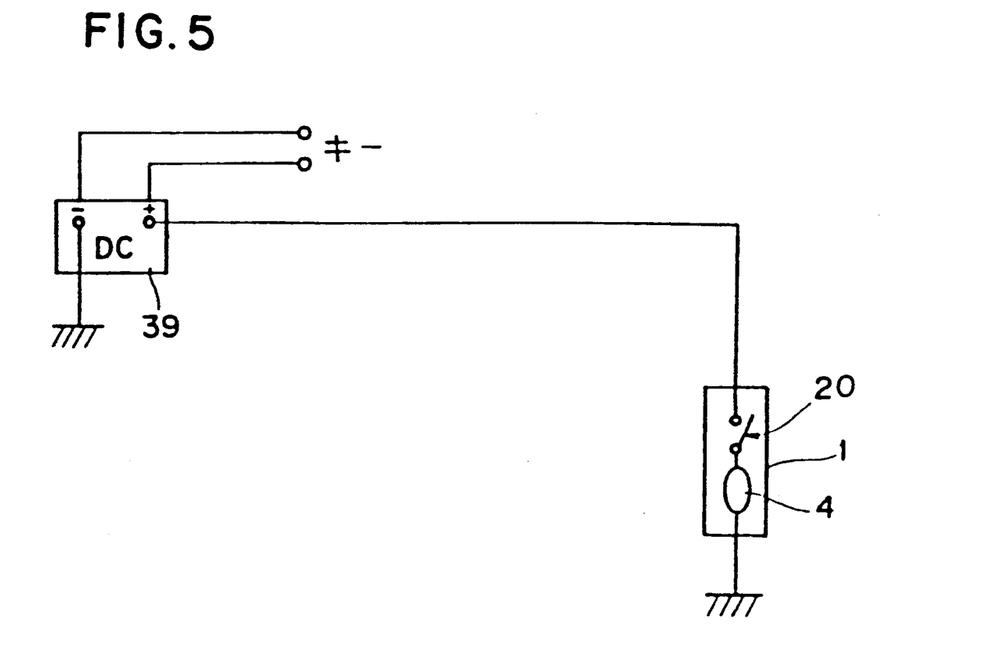
FIG. 5 is an electrical schematic of a circuit system employing the FIGS. 1-3 heating device.

A tripod shaped electrically conductive spring 8 for effecting energization and de-energization of heating element 4 from the terminal 14 is provided on the electrically conducting frame 7. A movable contact 10 that is provided on the tripod spring 8 is in contact with a stationary contact 11 that is provided on the terminal 14 inserted through aperture 9a of a bimetal disc 9. As shown in FIG. 4, heater element 4 is energized with current flow from the terminal 14 to the heating element 4. In other words, stationary contact 11, a bimetal disc 9 and a tripod spring 8 (movable contact 10) constitute a control switch 20 that effects the state of energization of the heating element 4.

In the upper side part (that side part which is opposite to the tip 3) of the housing 2, a header cap 12 having a terminal 14 and a stationary contact 11 is inserted and the upper side edge of the housing 2 is squeezed in such a manner as to embrace the cap 12 and, in close contact therewith, the interior of the housing 2 is sealed from the outside by means of the cap 12.

The heating device 1 is constructed in the manner as described above. Numeral 12a in FIG. 1 indicates the cavity or recessed portion of the cap 12, 12b indicates the side wall of the recessed portion 12a, 13 is a sealing ring and 15 is a lead wire for electricity supply. The lead wire 15 is connected to the positive side of the power supply and the throttle body (the object being heating) that is mounted in the housing 2 is connected to the earth or negative side.

In connection with electric conductance, the electric current that has been supplied from the terminal 14 by the lead wire 15 in the state where the movable contact 10 of the tripod spring 8 is in engagement with the stationary contact 11 is supplied to the heating element 4 through stationary contact 11, movable contact 10, tripod spring 8, an electrically conducting frame 7 and electrically conductive coil spring 5, with a result that the heating element 4 is heated.

The heat that has been generated by the heating element 4 is transmitted to the object being heated through the tip 3 of the housing 2.

As the object of heating is heated, next, the ambient temperature rises to a prescribed level and, when it reaches the prescribed temperature, the bimetal disc 9 effects a snapping action in such a direction as will push down the tripod spring 8 as is shown by a dashed line in FIG. 1.

As is shown in FIG. 1, the bimetal disc 9 is deformed from the initial state which is indicated by the solid line to a state showing warping in the opposite direction as shown by a dashed line and the peripheral part 9b of the bimetal disc 9 pushes against a ledge formed on the side wall 12b in the recess 12a of the cap 12 thereby pushing down tripod spring 8 as shown in FIG. 1. As a result of this, the movable contact 10 is separated from the stationary contact 11, with a consequence that the aforementioned electrical current from the terminal 14 to the heating element 4 stops.

As the supply of electricity to the heating element 4 is terminated, its heat generation is stopped, with a result that the heating of the object by the heating device 1 is no longer carried out. As a consequence of this, the ambient temperature drops to a prescribed level and, when it reaches the prescribed temperature range, the bimetal disc 9 is deformed opposite to what has been described above as indicated by a solid line in FIG. 1, the tripod spring 8 is relieved of its pressing pressure (the downward force) and the movable contact 10 engages the stationary contact 11.

Thus, electric conductance to the heating element 4 is carried out once again and the object of heating is heated to the prescribed temperature.

As described above, engagement and disengagement of the movable contact 10 with the stationary contact 11 are effected by means of the bimetal disc 9, thereby effecting the on-off control of the electric supply to the heating element 4. As a result, the object of heating can be heated in a stable manner to the prescribed temperature and maintained within a selected range of temperatures based on the temperature differential of the bimetal disc.

It is mentioned in this connection that the bimetal 9 that carries out the various actions as described above can be easily designed in such a manner as to carry out proper action in conformity with the ambient temperature employed of the heating device 1.

Figure 3:
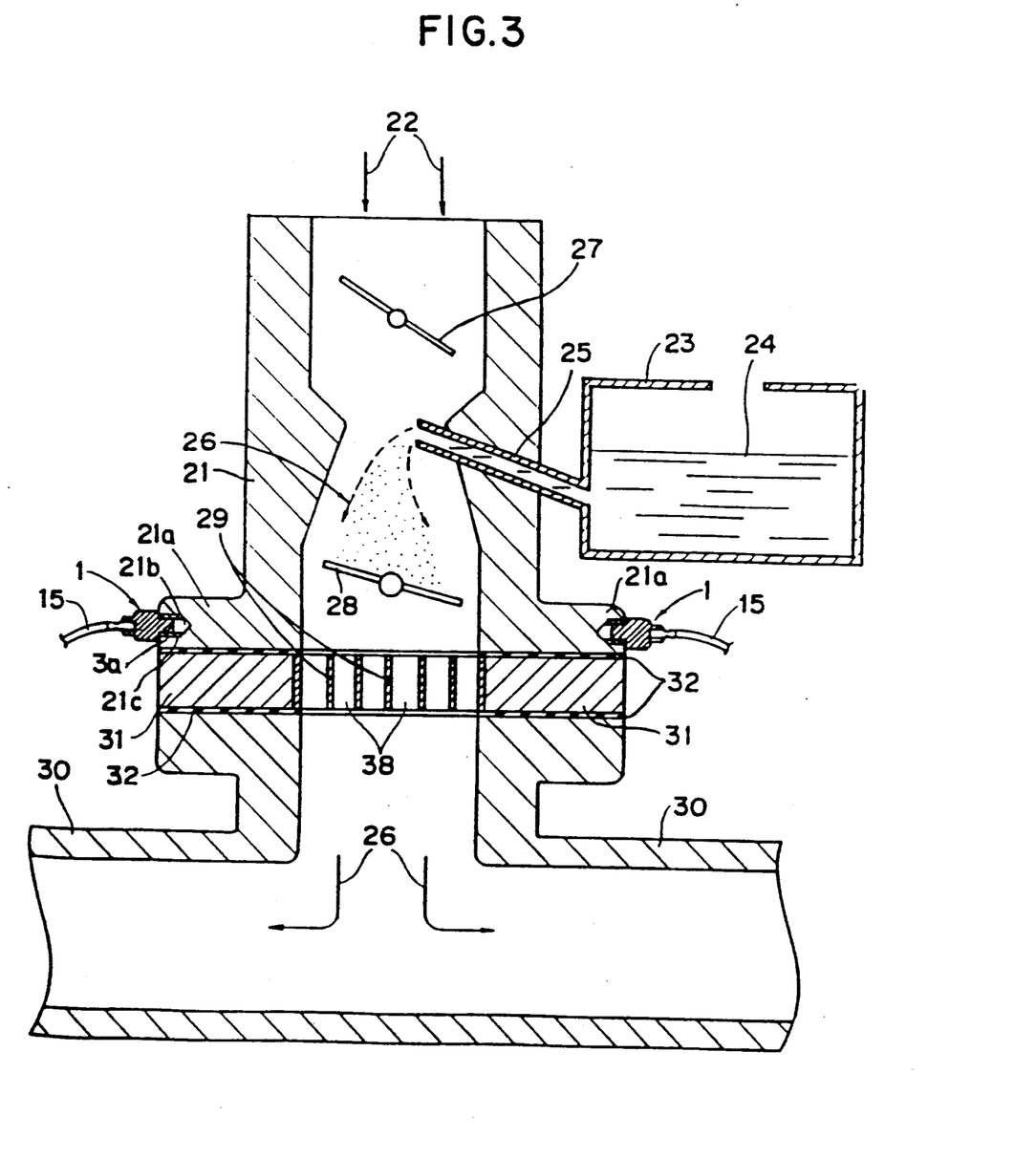
FIG. 3 is a cross section of a carburetor showing two heating devices mounted in the throttle body.

The heating device 1 is mounted in the flange 21a of the throttle body 21. This mounting is effected as shown in FIG. 4 which is an expanded figure of what is shown in FIG. 3. A blind hole 21b with a female screw 21c being formed therein is provided on the flange 21a and the male screw 3a of the housing 2 is screwed into a female screw 21c, thereby securing the heating device 1 to the flange 21a.

When the heating element 4 is heated by the electric current through the lead wire 15, the throttle body 21 which is shown in FIG. 3 is heated through the housing 2 and its tip 3.

According to the heating device 1 in this example, the heating element 4 and the housing 2 that accommodates this heating element 4 are unitized and a control switch 20 constituted by a bimetal disc 9, etc. that effects the on-off control of the electric supply to the heating element 4 is accommodated therein as described above, it becomes possible to stably heat the throttle body 21 to a prescribed temperature by using the unit having the desired shape and size.

In view of the fact that a switch part 20 that effects the on-off control of the electric supply to the heating element 4 is accommodated as described earlier, it will be highly advantageous in terms of mounting operations since a complicated electric circuit system for the control of the heating device as has been required in the past is no longer needed. As a result of this, a drastic cost reduction and an improvement of reliability are brought about.

Since the throttle body 21 is maintained at a prescribed temperature by the heating device 1 in this example, moreover, the mixed gas 26 that passes the throttle body 21 is heated to a prescribed temperature, with a result that the honeycomb heater 29 can be so arranged as to work only during the time when the temperature of the throttle body 21 rises to the prescribed level at the engine start-up time. Accordingly, the circuit system shown in FIG. 7 will not be abused and the drive control, too, can be precisely maintained.

Since it is not necessary to pass warm water to the manifold, moreover, it becomes easier to manufacture the manifold and there will be no danger of such a trouble arising as the insufficient passage of the water due to the adhesion of rust to the warm water passageway by the circulation of the cooling water.

In addition, the heating device 1 is so arranged as to be fixed to the throttle body by means of a screw and a hexagonal brim 2a is provided in the housing 2, with a consequence that, even if some trouble may arise in the heating device 1, the said heating device 1 can be easily exchanged by using a wrench and its maintenance is easily carried out.

This invention has been described above as an example. It will be further possible to modify the aforementioned example in conformity with the technical concept of this invention.

In the structure of the heating device 1 as described above, for example, electrically conducting frame 7 and the coil spring 5 for electric supply are not required and it is possible to construct it in such a manner that the tripod spring 8 can be directly installed on the heating element 4.

Moreover, other structures may also be suitably modified and various other kinds may be used in lieu of the bimetal disc 9, etc. that has been described above.

In addition to being installed on the throttle body as shown in the aforementioned example, further, the heating device 1 may also be installed from the side or from the lower surface of the flange 21a of the intake manifold shown in FIG. 3 in combination with the above.

Further, since there is no need to provide for the above-described control means outside the heating device, the heating device that is hereby offered is highly useful in terms of mounting.

Since the heating device 1 is simple in structure and unitized, the heating device 1 can easily be attached to or detached from the part that is to be heated. In addition, it is interchangeable, it can be used extremely conveniently on the carburetor of the automobile, the heater of the throttle body, the heater for the throttle chamber of the electronic fuel ignition device, the heater for the door key, and for the initial heating of the suspension oil or transmission oil, etc. plus those parts that require heating in the machines and equipment other than automobiles. In addition, the heater can be conveniently used at those locations in machines and equipment other than automobiles where icing tends to take place during the winter season.

As the screw threads 3a for the heating device 1, M16 or M18 screws may be conveniently used. Their size should be selected in accordance with the size of the heating device. The female screw thread 21c into which the male screw thread is inserted can be easily prepared by tapping.

In addition, the brim 2a of the housing 2 in the aforementioned heating device 1 can assume any suitable polygonal shape such as square or octagon in conformity with the size. In the event of a smaller size, a "suriwari" or a cross hole can be prepared so that both attachment and detachment can be carried out by using either a minus or a plus driver. As the tightening means, further, it is possible to use a tapered pin, various key cotters, etc. in conformity with the size in addition to the aforementioned screws.

As the heating element, a suitable heating element can be used in accordance with the usage such as a nichrome heater, etc. in addition to a positive coefficient of resistivity thermistor as the PTC element, etc.

Though the invention has been described with respect to a specific embodiment thereof, variations and modifications will become apparent to those skilled in the art. It is therefore the intention that the appended claims be interpreted as broadly as possible in view of the prior art to include all such variations and modifications.

We claim:

1. A throttle body for an internal combustion engine having a housing with an air inlet and a fuel inlet, an intake manifold, air and fuel passage means coupling the air inlet and the fuel inlet with an intake manifold, a honeycomb heater disposed in the air and fuel passage means, a combination heater and control device mounted in heat transfer relationship with the throttle body comprising a thermally conductive base having a generally cylindrical tip portion with a male thread formed on the outer periphery of the cylindrical portion received in a threaded base of the throttle body housing, the base having a generally open ended cupped shaped configuration forming a cavity having a bottom wall and a side wall upstanding therefrom, a positive temperature coefficient of resistivity (PTC) element disposed on the bottom wall, a ledge formed in the side wall, an electrically insulating washer mounted on the ledge, an electrically conductive plate disposed on the washer and being electrically separated from the side wall, electrically conductive contact means engaging the bottom surface of the plate and top surface of the PTC element, an electrically insulative header mounting a stationary electrical contact received on a distal end portion of the side wall closing the open end, an electrically conductive spring member mounting a movable contact movable into and out of engagement with the stationary contact, the spring member resiliently extending between the top surface of the plate and the stationary contact and an annular shaped bimetallic disc disposed in the cavity between the stationary contact and the spring member, the bimetallic disc having first and second configurations depended upon its temperature, in one of its first and second positions the disc biases the spring member away from the stationary contact.

2. A throttle body according to claim 1 in which the tip portion is a solid mass.

3. A throttle body according to claim 1 in which the electrically conductive contact means engaging the bottom surface of the plate and the top surface of the PTC element is a generally conical shaped spring.

4. A throttle body according to claim 3 in which the electrically conductive spring member resiliently extending between the top surface of the plate and the stationary contact is configured as a tripod with three legs projecting outwardly from the movable contact.

5. A throttle body for an internal combustion engine having a housing with an air inlet and a fuel inlet, an intake manifold, air and fuel passage means coupling the air inlet and the fuel inlet with an intake manifold, a honeycomb heater disposed in the air and fuel passage means, a combination heater and control device mounted in heat transfer relationship with the throttle body comprising a thermally conductive base, the base having a generally open ended cupped shaped configuration forming a cavity having a bottom wall and a side wall upstanding therefrom, a resistive heater positive element disposed on the bottom wall, a ledge formed in the side wall, an electrically insulating washer mounted on the ledge, an electrically conductive plate disposed on the washer and being electrically separated from the side wall, electrically conductive contact means engaging the bottom surface of the plate and top surface of the heater element, an electrically insulative header mounting a stationary electrical contact received on a distal end portion of the side wall closing the open end, an electrically conductive spring member mounting a movable contact movable into and out of engagement with the stationary contact, the spring member resiliently extending between the top surface of the plate and the stationary contact and an annular shaped bimetallic disc disposed in the cavity between the stationary contact and the spring member, the bimetallic disc having first and second configurations depended upon its temperature, in one of its first and second positions the disc biases the spring member away from the stationary contact.

6. A throttle body according to claim 5 in which the heater element is composed of positive temperature coefficient of resistivity (PTC) material.

7. A throttle body according to claim 6 in which the top portion is a solid mass.

8. A throttle body according to claim 6 in which the electrically conductive contact means engaging the bottom surface of the plate and the top surface of the PTC element is a generally conical shaped spring.

9. A throttle body according to claim 8 in which the electrically conductive spring member resiliently extending between the top surface of the plate and the stationary contact is configured as a tripod with three legs projecting outwardly from the movable contact.

10. A heating device for heating a body to a selected temperature and maintaining the temperature of the body within a selected range of temperatures, comprising means to mount the device in heat transfer relationship with the body comprising a thermally conductive base having a generally cylindrical portion with a male thread formed on the outer periphery of the cylindrical portion, the base having a generally open ended cupped shaped configuration forming a cavity having a bottom wall and a side wall upstanding therefrom, a heater element disposed on the bottom wall, a ledge formed in the side wall, an electrically insulating washer mounted on the ledge, an electrically conductive plate disposed on the washer and being electrically separated from the side wall, electrically conductive contact means engaging the bottom surface of the plate and top surface of the heater element, an electrically insulative header mounting a stationary electrical contact received on a distal end portion of the side wall closing the open end, an electrically conductive spring member mounting a movable contact movable into and out of engagement with the stationary contact, the spring member resiliently extending between the top surface of the plate and the stationary contact and an annular shaped bimetallic disc disposed in the cavity between the stationary contact and the spring member, the bimetallic disc having first and second configurations depended upon its temperature, in one of its first and second positions the disc biases the spring member away from the stationary contact.

11. A heating device according to claim 10 in which the heater element is composed of positive temperature coefficient of resistivity (PTC) material.

12. A heating device according to claim 11 in which the top portion is a solid mass.

13. A heating device according to claim 11 in which the electrically conductive contact means engaging the bottom surface of the plate and the top surface of the PTC element is a generally conical shaped spring.

14. A heating device according to claim 13 in which the electrically conductive spring member resiliently extending between the to surface of the plate and the stationary contact is configured as a tripod with three legs projecting outwardly from the movable contact.

15. A heating device for heating a body to a selected temperature and maintaining the temperature within a selected range of temperatures, comprising means to mount the device in heat transfer relationship with the body comprising a thermally and electrically conductive base having a generally cylindrical portion with a male thread formed on the outer periphery of the cylindrical portion received in a threaded base of the throttle body housing, the base having a generally open ended cupped shaped configuration forming a cavity having a bottom wall and a side wall upstanding therefrom, a positive temperature coefficient of resistivity (PTC) element electrically coupled to and disposed on the bottom wall, an electrically insulative header mounting a stationary electrical contact received on a distal end portion of the side wall closing the open end, an electrically conductive spring member disposed in the cavity mounting a movable contact movable into and out of engagement with the stationary contact, means to electrically couple the PTC element and the electrically conductive spring member, and a bimetallic disc disposed in the cavity between the stationary contact and the spring member, the bimetallic disc having first and second configurations dependent upon its temperature, in one of its first and second positions the disc biases the spring member away from the stationary contact.

* * * * *